B. LOOMIS.
PROCESS OF MAKING CELLULOSE.
APPLICATION FILED NOV. 1, 1916.

1,311,980.

Patented Aug. 5, 1919.
2 SHEETS—SHEET 1.

Inventor
Burdett Loomis
By E. B. Clark
Attorney

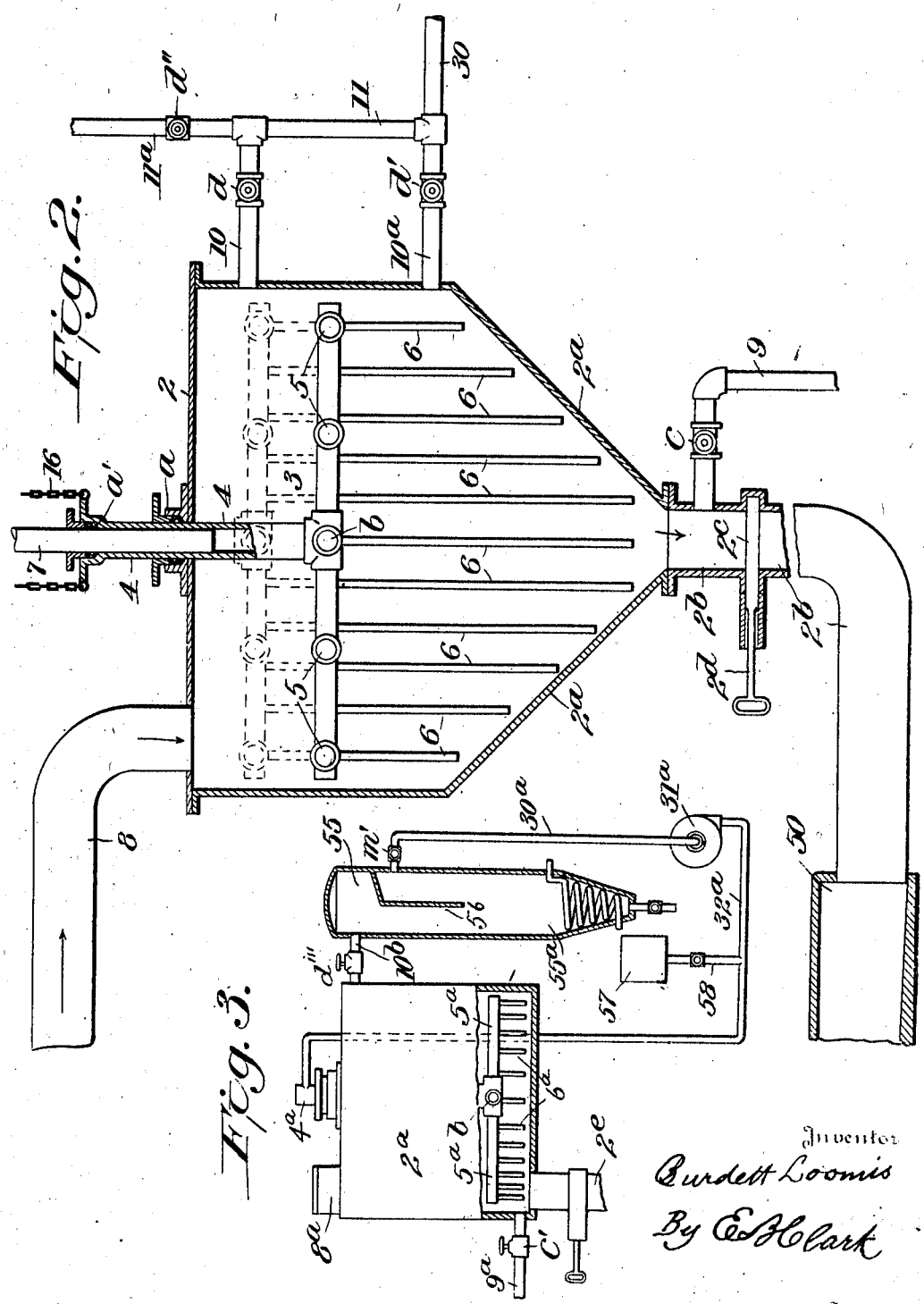

UNITED STATES PATENT OFFICE.

BURDETT LOOMIS, OF HARTFORD, CONNECTICUT, ASSIGNOR TO GRACE L. LOOMIS, OF HARTFORD, CONNECTICUT.

PROCESS OF MAKING CELLULOSE.

1,311,980.  Specification of Letters Patent.  Patented Aug. 5, 1919.

Application filed November 1, 1916. Serial No. 129,011.

*To all whom it may concern:*

Be it known that I, BURDETT LOOMIS, citizen of the United States, residing at Hartford, in the county of Hartford and State of Connecticut, have invented certain new and useful Improvements in Processes of Making Cellulose, of which the following is a specification.

This invention relates to the manufacture of cellulose from various kinds of plants and fiber material in the green condition.

The principal object of my invention is to provide a process for more effectively and economically reducing green plant material to cellulose for paper making; also to extract and save natural constituents, such as tannic acid, saccharine matter, gummy and resinous matter, etc. from various kinds of plant material.

A special object is to provide for producing cellulose with stronger and better fiber by thoroughly extracting the saccharine matter from green plant material by macerating the material in water or plant liquor at a low temperature,—from about 100° F. to 200° F.—and then drawing off the liquor and adding fresh water, thereby developing a class of bacteria which do not attack or injure the fiber, but on the contrary leaves it strong and of increased value. The water or liquor may be drawn off and fresh water added several times during the treating operation for better separating the different constituents of the plant material.

Another object is to provide for better comminuting or shredding plant material and transferring or forcing it to a digester or treating tank, circulating numerous streams of warm water or liquor through the material and through a heater, passing the pulp material from the digester to a beating engine and forcing the finished cellulose to a paper machine.

Other objects and purposes of my invention will appear in the following description of the process.

The matter constituting my invention will be set forth in the claims.

I will now describe my process in connection with the accompanying drawings which illustrate one form of apparatus for carrying it into practice, and in which—

Fig. 2 represents a vertical section of my preferred form of digester or treating tank and part of a beating engine.

Fig. 3 represents a sectional elevation of a modified form of apparatus.

Figure 1:
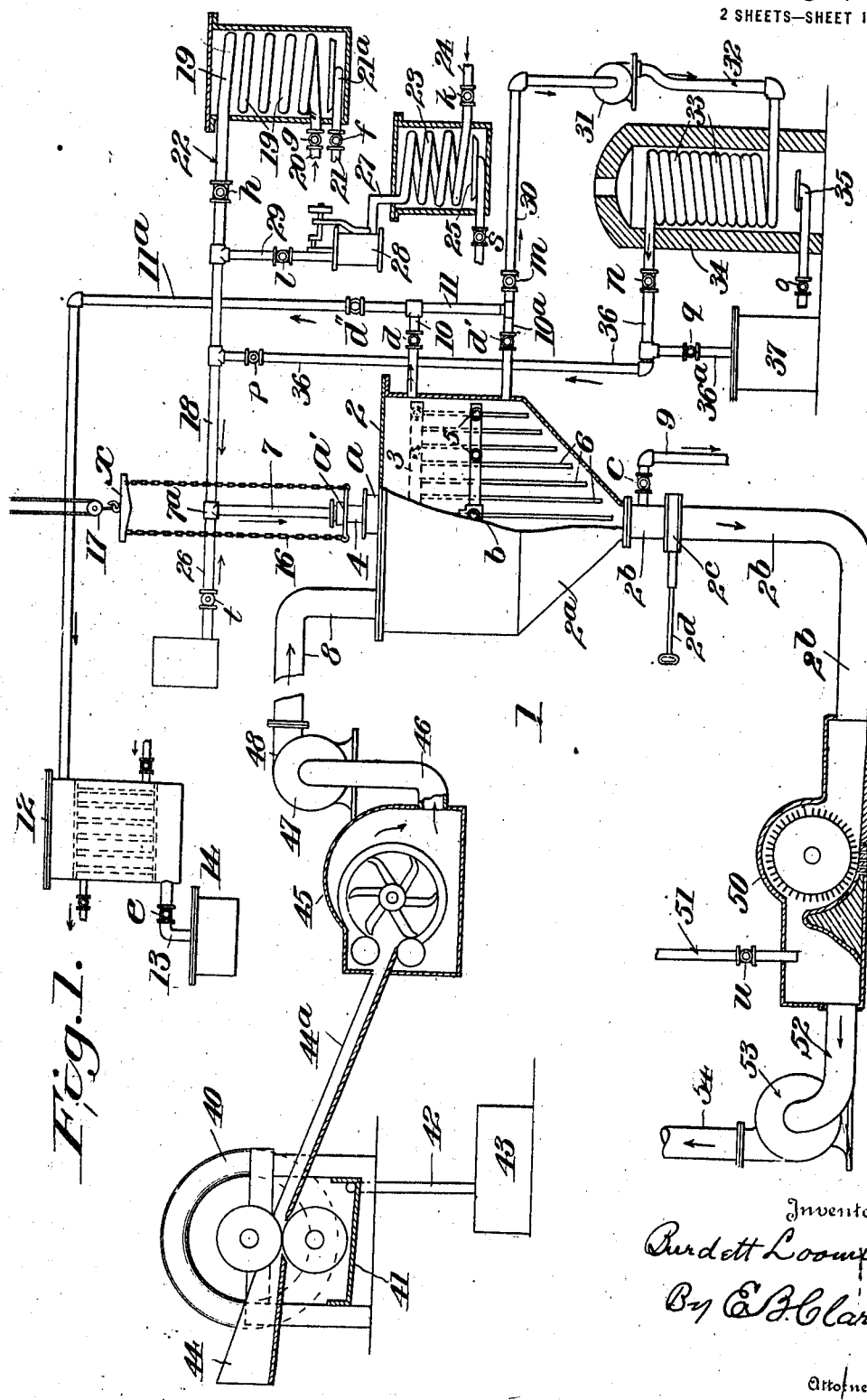
Figure 1 represents a sectional elevation of the apparatus.

The apparatus 1, comprises, as principal parts, a treating tank 2, a heater 33 for the circulating liquid, a cane press 40, a shredder 45 and a beating engine 50, all suitably connected by pipes, pumps, etc. The treating tank 2 is constructed of plate iron with a contracted or drawn in bottom $2^a$, to which is connected a discharge pipe $2^b$ leading to a beating engine 50. The pipe $2^b$ is provided with a gate valve $2^c$, having a stem $2^d$. Within tank 2 is suspended a movable distributing pipe system 3, composed of a sliding telescopic pipe 4, a series of radial and circular pipes 5 and numerous depending discharge pipes 6, of suitable lengths to extend to the contracted bottom when in the lowered position, as shown in full lines. The dotted lines indicate that the system may be raised for better discharging the contents of the tank. The radial pipes are connected by a fitting $b$ to pipe 4. The fixed liquid supply pipe 7 extends down through a stuffing box $a'$ into pipe 4 and the latter pipe slides through a stuffing box $a$ secured to the top of the tank. Pipe 7 connects by a T fitting $7^a$ with pipes 18 and 26. Chains 16 are connected to a flange of pipe 4 and to a cross bar $x$, to which is attached a pulley 17 for raising pipe 4 and the distributing pipes. A feed pipe 8 for shredded plant material connects with the top of tank 2. To the bottom discharge pipe $2^b$ is connected a discharge pipe 9, having a valve $c$, for drawing off liquor containing extracts, such as tannin or saccharine matter.

With the side of tank 2 are connected outlet pipes 10—$10^a$, having valves $d$—$d'$, and connecting with the upright pipes 11—$11^a$. Pipe $11^a$ has a valve $d''$ and leads to a condenser 12, having the usual inlet and outlet pipes for cooling water, and a bottom discharge pipe 13, having a valve $e$, connecting with a seal box 14 for products of condensation.

A gas heating coil 19 is placed in a casing and has a gas supply pipe 20, having a valve $g$ and an outlet pipe 22, having a valve $h$, connecting with pipe 18. A gas pipe 21, having a valve $f$ supplies a burner $21^a$. A neutral gas composed largely of hydrogen may be heated in the coil and passed into the material in the treating tank. A water heating coil 23 is inclosed in a casing and has an inlet pipe 24, having a valve $k$, and an outlet pipe 27 connecting with a force pump 28, from which leads a pipe 29, having a valve $l$, and connecting with pipe 22. The coil 23 is heated by a gas burner 25 having a supply pipe and valve $s$. A supply pipe 26, having a valve $t$, for milk of lime or alkaline solution, connects with pipe 7 at the T-fitting $7^a$.

A pipe 30, having a valve $m$, connects with pipe 11 and with a rotary force pump 31, from which a pipe 32 leads to a heating coil 33 in furnace 34, having a gas burner 35 and supply pipe having a valve $o$. An outlet pipe 36, having a check valve $n$ leads from the coil and connects with pipe 18. The pipe 36 also has a valve $p$. A branch pipe $36^a$, having a valve $q$, connects pipe 36 with a liquor storage tank 37, which may be of any desired size.

For the purpose of pressing out juice containing saccharine matter from cane, Kafir corn stalks and other material I provide pressure rolls 40 mounted in a frame, also a juice pan 41. A pipe 42 leads from the pan to a storage tank 43. A feeding chute 44 and a discharge chute $44^a$ are secured to the frame, and the chute $44^a$ connects with a shredding machine 45. This machine reduces the cane and other plant material to short lengths and comparatively fine shreds, ready for treatment in the diffusion and extracting tank 2. A discharge pipe 46 connects the case of the shredder with a rotary exhauster and blower 47, having a discharge nozzle 48, with which connects the feed pipe 8 opening into the treating tank 2. The exhauster and blower operates to draw off the shredded material and discharge it into tank 2.

A beating engine 50 may connect directly with the discharge pipe $2^b$ of tank 2 as shown, and will operate in a well known manner to reduce the shredded and digested material to pulp or cellulose. An outlet pipe 52 may connect the engine with a rotary exhauster 53 having a discharge pipe 54. A pipe 51, having a valve $u$, connects with the beating engine and may be used for supplying a bleaching solution or liquor, such as hypochlorite of sodium, or chlorid of lime. The pipe 54 may connect with a storage tank or directly to a paper making machine.

In carrying out my process I treat green plants, such as marsh grass, rushes, palmetto, Kafir corn, sugar cane, sunflower stalks, banana stalks, etc., and first press out the juice which contains a valuable per cent. of saccharine matter. This juice is saved and may be fermented in a well known manner and the mash distilled for recovering the alcohol. The juice may also be concentrated for producing a syrup suitable for stock food. The green plant material will be passed through the pressure rolls 40 and then passed into the shredding machine 45 and reduced to fine short shreds. These are drawn off by the exhauster 47 and delivered into the treating tank 2. Warm water, below the boiling point will then be forced by pump 28 through pipes 29, 18 and 7 into the distributing pipes 5 and 6 from which it will be passed in numerous streams into the body of material. The water will pass uniformly up through the shredded material and extract the saccharine matter. An even temperature below 150° F. is maintained for a period of eight to twelve hours, according to the kind of plant being treated. The material is thus subjected to a steeping or diffusion operation till the saccharine matter is extracted, then a fermentation process sets in, due to the development of bacteria that feed on the sugar and which, if left in the tank, destroy the value of the plant fiber. At this stage I therefore draw off the liquor through pipe 9 and admit fresh water and continue the treatment. Another class of bacteria is now developed which do not attack or injure the fiber. If it is desired particularly to obtain fiber the temperature is kept low for the necessary length of time to separate the fiber. In case cellulose or pulp is to be made the temperature may be raised to, or above, 150° F. and the liquor will be circulated by the pump 31 through the heater coil 33, then through pipes 36, 18, 7 and 4, and the distributing pipes 5 and 6, in numerous streams through the material, thus around repeatedly. Finally the temperature may be raised to about 212° F. to finish the cooking operation. Some kind of alkali, such as a solution of caustic soda or milk of lime, may now be admitted through pipe 26 and mixed with the pulp and the cooking continued the required length of time. The cooked material will be discharged through pipe $2^b$ by opening valve $2^c$ into the beating engine 50 where it is prepared for the paper making machine. In the beater engine I preferably add chlorid of lime or hypochlorites, by admitting a solution through pipe 51.

A warm neutral gas, such as water-gas or producer gas, may be passed into the digester tank 2 for driving out oxygen and vapors of volatile oils. These vapors will be condensed in the condenser 12 and the oil collected. Gas may also be forced under pressure into the treating tank at the end of the extracting or digesting operation to force out the steeped or cooked material through pipe $2^b$. My process is not confined to passing the treated material directly to the beating engine; it may be discharged into any tank or not as desired.

The operation of drawing off liquor containing extracted matter of any kind may be repeated with the addition of fresh water to the tank several times, in order to remove matter not desired in paper pulp or cellulose. In case palmetto plants and roots are being treated for extracting tannic acid and preparing cellulose, the temperature is preferably maintained for the first period of several hours at about 100° F., and then it is raised to about 150° F. and kept at that degree till extraction is completed. The liquor is then drawn off and may be concentrated. While extracting the tannic acid the temperature of the liquor should never be raised to the boiling point as that temperature injures the properties of the extract and causes too much of the gummy matter to be dissolved. After the tannin extract has been drawn off fresh water may be admitted to the tank and the temperature raised to about 212° F. for dissolving part of the gummy matter, and at this stage an alkaline solution may be admitted through pipe 26 for expediting the operation. This is important at this particular stage of the treatment.

By my process of extracting saccharine matter, tannic acid and other constituents, first at a low temperature of about 100° F., then at about 150° F., much better extracts—tannic acid, saccharine matter, etc.—are produced, and the fiber of the plant material is made much stronger. By my method of treatment the strength of palmetto fiber has been increased fifty per cent. This is a very valuable improvement in the art of preparing fiber plant material either for cellulose or for fiber to be made into rope or a woven fabric. The above remarks apply to the banana plant, Kafir corn, sugar cane and other plant material. In my process the liquor is preferably circulated by a pump 31 through a heater and thence in numerous streams through the body of material in tank 2. Part of the liquor is also preferably drawn off into tank 37 and used over again to increase its strength and obtain other valuable results.

The treating tank and connections may be of modified construction as shown in Fig. 3. Here the treating tank 2ª may be constructed to be heated externally, as by a stove or furnace. Inlet pipes 4ª and 5ª, having discharge pipe 6ª may supply water or liquor in numerous streams close to the flat bottom of the tank. The water will be spread over the bottom and then rise through the shredded material. A discharge pipe 2ᵉ for pulp is connected to the bottom of the tank and has a gate valve. A draw-off pipe 9ª for liquor, having a valve c' may connect with pipe 2ᵉ or with other convenient part as shown. A filling opening 8ª, having a cover, is placed in the top of the tank. A liquor and vapor discharge pipe 10ᵇ, having a valve d''', leads from the top of the tank and connects with a depositing and separating chamber 55—55ª, having a deflecting hood 56. An outlet pipe 30ª, having a valve m', connects below the top of the hood and leads to a circulating pump 31ª. The discharge pipe 32ª of the pump connects with the inlet pipe 4ª of the tank 2ª. An elevated tank 57 is provided for holding an alkaline solution or a bleaching liquor, and connects by a valved pipe 58 with pipe 32ª, or it may connect in any other manner with tank 2ª.

The operation in this modified form of apparatus in substantially the same as that above described with reference to Fig. 1. Provision, however, is here made for separating resinous or gummy matter in the depositing chamber 55—55ª. This is important and valuable when fiber material containing much gummy or resinous matter is being treated. With the connection shown the alkaline solution will be spread uniformly over the bottom of the treating tank and then passed uniformly up through the whole mass of the fiber material.

In practice all the necessary pressure gages and thermometers are placed on the apparatus so as to exactly regulate the heat and pressure as required.

Having described my invention, what I claim, and desire to secure by Letters Patent, is:

1. The process of making cellulose, which consists in subjecting shredded green plant material to maceration in a closed chamber at a temperature below the boiling point and circulating the liquid in streams through the material, then drawing off the liquid extract, adding fresh water and an alkaline chemical to the material and raising the temperature to about 212° F. to dissolve gummy and resinous matter and finish the cooking operation, whereby cellulose of strong fiber is produced.

2. The process of making cellulose, which consists in subjecting shredded green plant material to maceration in a closed chamber at a temperature below the boiling point and circulating the liquid in streams through the material for extracting saccharine and other matter, drawing off liquid extract, adding fresh water and an alkali and increasing the temperature, drawing off and separating gummy and resinous matter, and continuing the cooking operation till finished.

3. The process of making cellulose, which consists in subjecting shredded green plant material to maceration in a closed chamber at a temperature below the boiling point and circulating the liquid in streams through the material, then drawing off the liquid extract and circulating fresh water at a gradually increased temperature through the material, adding an alkaline chemical to the material and raising the temperature to about 212° F.

to finish the cooking operation, whereby cellulose of strong fiber is produced.

4. The process of making cellulose, which consists in subjecting shredded green plant material to maceration in a closed chamber at a temperature below the boiling point and circulating the liquid in streams through the material for extracting saccharine and other matter, drawing off liquid extract, adding and circulating fresh water at an increased temperature, adding alkali and continuing the cooking operation till finished, then transferring the cooked material to a beating engine and therein preparing it for paper making.

5. The process of making cellulose, which consists in macerating green plant material at a temperature of about 100° F. for extracting saccharine and other matter, drawing off the liquid extract and adding fresh water repeatedly and maintaining a temperature of about 150° F., circulating the liquid in streams through the material and continuing the operation at a low temperature to avoid dissolving the gummy or resinous matter in the material and finally increasing the temperature to finish the cooking operation.

6. The process of making cellulose, which consists in pressing the juice from green plant material, then shredding and discharging it to a treating tank, then macerating the material at a temperature which will not dissolve the gummy matter, drawing off the liquid extract and adding fresh water and finishing the treatment at an increased temperature.

In testimony whereof I affix my signature in presence of two witnesses.

BURDETT LOOMIS.

Witnesses:
G. L. LOOMIS,
LUCRETIA M. LOOMIS.